United States Patent
Horn

(10) Patent No.: US 8,564,798 B2
(45) Date of Patent: Oct. 22, 2013

(54) VALIDATION OF PRINT JOBS USING BITMAPPED IMAGE

(75) Inventor: Richard T. Horn, Claremont, CA (US)

(73) Assignee: Xerox Corporation, Norwalk, CT (US)

( * ) Notice: Subject to any disclaimer, the term of this patent is extended or adjusted under 35 U.S.C. 154(b) by 795 days.

(21) Appl. No.: 12/716,645

(22) Filed: Mar. 3, 2010

(65) Prior Publication Data

US 2011/0216345 A1     Sep. 8, 2011

(51) Int. Cl.
    *G06K 15/00*     (2006.01)
(52) U.S. Cl.
    USPC ........... 358/1.14; 358/1.1; 358/462; 382/112; 399/16; 399/15; 340/5.2; 340/5.8; 340/5.86
(58) Field of Classification Search
    None
    See application file for complete search history.

(56) References Cited

U.S. PATENT DOCUMENTS

| 5,075,875 | A | * | 12/1991 | Love et al. ................... 358/1.18 |
| 7,061,630 | B2 | | 6/2006 | Murray |
| 7,293,150 | B2 | | 11/2007 | Witt et al. |
| 7,587,079 | B2 | * | 9/2009 | Marlett et al. ................ 382/139 |
| 2003/0090699 | A1 | * | 5/2003 | Meyerhofer et al. ........ 358/1.14 |
| 2007/0165267 | A1 | * | 7/2007 | Fransazov .................... 358/1.15 |
| 2008/0016304 | A1 | | 1/2008 | Witt et al. |
| 2009/0159658 | A1 | | 6/2009 | Cheung et al. |

* cited by examiner

*Primary Examiner* — Paul F Payer
(74) *Attorney, Agent, or Firm* — Gibb & Riley, LLC

(57) ABSTRACT

A method and apparatus capture bitmapped images of pages of a print job that have been raster image processed by a digital front end of a printing device (while they are being printed by the printing device). The bitmapped images are captured from the printing device's buffer using a computerized device potentially positioned within the printing device. The computerized device collects image data from at least one predetermined area of the bitmapped images of the pages and performs optical character processing on the image data to identify characters and numbers within the bitmapped images. The computerized device processes the characters and numbers into accumulated data for the pages of the print job. Then the computerized device compares the accumulated data to expected data to validate whether the print job printed correctly.

16 Claims, 2 Drawing Sheets

VALIDATION OF PRINT JOBS USING BITMAPPED IMAGE

BACKGROUND AND SUMMARY

Embodiments herein generally relate to printing devices and more particularly to a printing device and method that uses optical character recognition of bitmap images to validate print jobs.

The embodiments herein relate to how to use a printer to collect electronic image data within a document during the print process to validate each page and provide a record of key information unique for each page regardless of original print stream format.

When printing an item, electronic files that contain instructions on how to construct and print a document are sent to a printer. These instructions are interpreted by the printer and page images are composed and then used to drive the printing mechanism to image each page on the transfer media. The final printed image is therefore impacted primarily by the instructions on how it should be constructed and the performance quality of the printing mechanism and transfer process. Quality control of the printed output can be performed by manual inspection after the job has completed printed. However, this approach causes considerable expense in handling and inspection.

One embodiment herein provides a method that captures bitmapped images of pages of a print job that have been raster image processed by a digital front end of a printing device (while they are being printed by the printing device). The bitmapped images are captured from the printing device's buffer using a computerized device, potentially positioned within the printing device. The computerized device collects electronic image data from at least one predetermined area of the bitmapped images of the pages and performs optical character processing on the electronic image data to identify characters and numbers within the bitmapped images. The computerized device processes the characters and numbers into accumulated data for the pages of the print job. Then the computerized device compares the accumulated data to expected data to validate whether the print job printed correctly.

While the foregoing describes a method embodiment, a device embodiment is also presented herein. Such a printing device comprises a computerized device that captures bitmapped images of pages of a print job that have been raster image processed while being printed by the printing device. The computerized device collects electronic image data from at least one predetermined area of the bitmapped images of the pages and processes the electronic image data into accumulated data for the pages of the print job. The computerized device compares the accumulated data to expected data to validate whether said print job printed correctly.

The method and apparatus embodiments herein can produce an audit report based on the comparing process using the computerized device and output the audit report from the printing device. The processing of the electronic image data comprises performing at least one mathematical operation on the numbers using the computerized device. The collecting, processing, and comparing processes are performed on the print job by the computerized device in real time while the printing device is printing the print job. Further, the "at least one area" of the bitmapped images can be less than all of each bitmapped image, but gradually is the same area on each of the bitmapped images.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, quality control of the printed output is an important issue. In particular for those documents that contain certain financial information such as checks, it is desirable to determine a sum of all the monies indicated by the checks. Similar issues exist for all critical documents, such as stocks, bonds, insurance policies, legal documents, etc. Print stream languages use different artifacts to pass information around the actual print process and a stable printer-independent solution to tracking such data is provided by the embodiments herein.

The embodiments herein support the real time acquisition of information from the printer constructed print image to validate intended data within the page images and to provide a mechanism for interpretation of specific character/numerical, fields independent of print stream format. The embodiments herein do not require any modification or special handling of the original document definition. The interpreted information is used to provide running totals and summations along with the capability of unique page identification, if appropriate marks are included within the page. The embodiments herein sample, in real time, a selected area of the bitmapped image produced for each page image and process the data to identify the page (and to record its order of printing if desired) and to create a running sum of all selected values if requested by operator setup.

Figure 1:
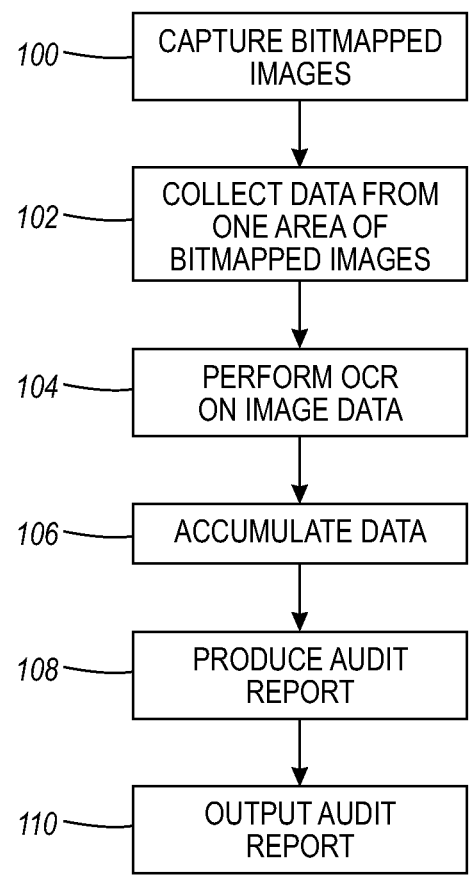
FIG. 1 is a flow diagram illustrating embodiments herein.

FIG. 1 is a flowchart illustrating one method embodiment herein that, in item 100, captures bitmapped images of pages of a print job that have been raster image processed by a digital front end of a printing device (while they are being printed by the printing device). The bitmapped images are captured from the printing device's buffer using a computerized device, potentially positioned within the printing device. In other words, the bitmapped images contain information on a pixel-by-pixel basis which, when combined, create an electronic form of an image.

This electronic form of the image is different than an image that is physically printed on the sheet of media and that is observable by the user. To the contrary, the electronic form of the image that is obtained from the printing device's buffer is not physically observable, and is instead stored as electronic signals within the printing device's computerized memory (storage medium). The electronic form of the image is similar to the electronic data that would be obtained through a documents scan; however, with the embodiments herein no scanning is performed because the information is taken from the printing device's buffer as it prepares the print job for printing.

In item 102, the computerized device collects electronic image data from at least one predetermined area of the bitmapped images of the pages. As shown below in greater detail in FIG. 3, the "at least one predetermined area" of the bitmapped images can be less than all of each bitmapped image, but is generally the same area on each of the bitmapped images. For example, the selected area could be the lower right quarter of the page, a portion of the third line of the page, a square inch of a specific X-Y location on the page, etc.

The computerized device also performs optical character processing on the electronic image data to identify characters and numbers within the bitmapped images in item 104. The processing utilized to perform optical character recognition is well-known by those ordinarily skilled in the art, and a detailed discussion of the same is omitted. For example, many optical character recognition programs are available from various vendors such as, Nuance Communications, Inc., Burlington, Mass., United States.

Next, in item 106, the computerized device processes the characters and numbers into accumulated data for the pages of the print job. The processing of the electronic image data comprises performing at least one mathematical operation on the numbers using the computerized device.

Then the computerized device compares the accumulated data to expected data to validate whether the print job printed correctly in item 108. For example, the user may provide verification data that can include numerical totals, names, dates, etc., which are expected to be produced by the print job. The accumulated data is compared to this verification data to see if the two are the same or different. In item 110, the embodiments herein produce an audit report based on the comparing process using the computerized device and output the audit report from the printing device. The audit report will identify any inconsistencies between the accumulated data and the verification data.

The processes of capturing (100), collecting (102), character recognition (104), and accumulating data (106), and others are performed on the print job by the computerized device in real time while the printing device is printing the print job.

Figure 2:
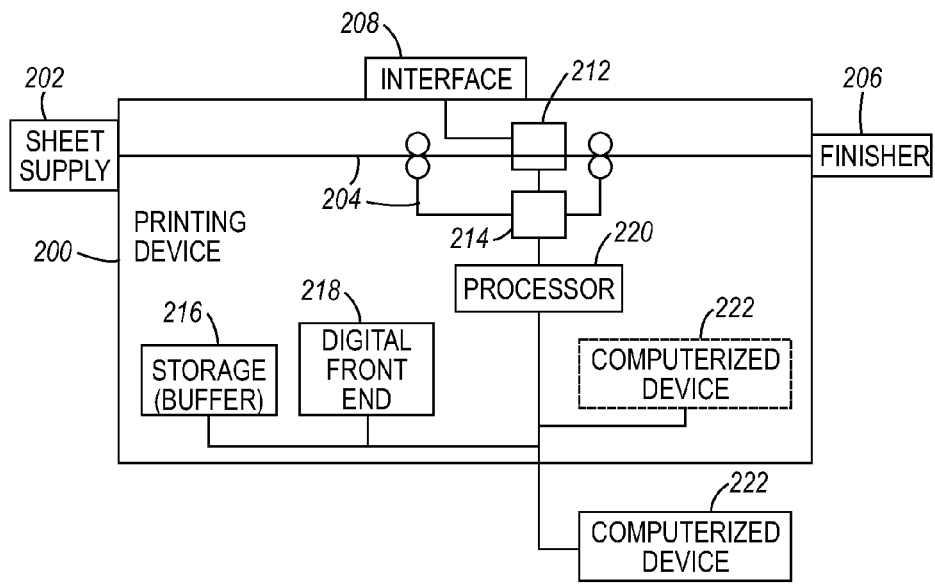
FIG. 2 is a side-view schematic diagram of a device according to embodiments herein.

A printing device 200 embodiment is illustrated in FIG. 2. A sheet supply feeds sheets of media along a media path 204 to one or more printing/marking engines 212, 214. The media path 204 can include at least one feedback loop for multiplexing and multiple pass printing. After printing, the media path 204 feeds the printed sheets to an output tray, sorter, or finisher 206. The details of printers, printing engines, etc., are well-known by those ordinarily skilled in the art and are discussed in, for example, U.S. Pat. No. 6,032,004, the complete disclosure of which is fully incorporated herein by reference.

Further, the printing device 200 includes a storage device 216 that comprises any form of electronic storage media (capacitor-based, magnetic media-based, optical, etc.) whether now known or developed in the future. The storage device 216 not only acts as a buffer for the bitmaps, it also stores programs of instructions that are executed by the processor 218. These programs of instructions cause the printing device 200 to perform the necessary actions to cause printing operations to occur and also cause the printing device to perform the various methods that are described herein.

An interface 208 (which can be a graphic user interface, computer network interface, etc.) receives a stream of print jobs that are processed by the digital front end (DFE) processor 218. In the printer's digital front end 218, after the each page is decomposed into bitmap(s), the processor 220 process the bitmapped information using optical character reading software tools, or other image recognition techniques, and provides operator selectable applications to apply to the data. The user interface 208 also allows the user to select and/or create and save a per page template that can be used to determine the sample areas.

The digital front end 218 converts the pages within the print stream (rasterizes the images in a process known as raster image processing (RIP)) into pixel-by-pixel information that makes up a bitmap of pixel information that is used by the printing engines 212, 214 to actually print the pages. Each pixel tells the printing engines 212, 214 exactly where to make marks on the printed pages. Such bitmapped images can be temporarily stored in the buffer 216 to allow the printing engines 212, 214 to operate more efficiently. The embodiments herein take advantage of the storage of the bitmapped images in the buffer 216 and use such data to determine if the print job was printed correctly.

The embodiments herein use a computerized device 222 that captures the bitmapped images of pages of the print job that have been raster image processed while being printed by the printing device 200. Note that, as illustrated in FIG. 2, the computerized device 222 can be located within the printing device 200 or can be a separate device that is operatively connected to (directly or indirectly connected to) the printing device 200. The computerized device 222 collects electronic image data from at least one predetermined area of the bitmapped images of the pages and processes the electronic image data into accumulated data for the pages of the print job. The computerized device 222 compares the accumulated data to expected data to validate whether said print job printed correctly.

When printing documents of value (monetary value, intellectual value, security value, personal information value, etc.), there is often a need to know that the document was printed as close as possible to the requested page image from the submitted electronic instructions, that it was printed in the right order, and to gather actual information from each page that may be presented in an audit report such as summations of selected numerical fields on the pages.

Historically, for page verification, this is done by printing a sequential bar code on the sheets of paper and then reading the bar code with an external scanning/reading device. However, printing items such as a barcode on each sheet can be technically difficult to add to existing print streams and aesthetically displeasing to many customers. Further, the barcode reader made periodically required customer adjustment, sometimes from job to job.

To the contrary, the embodiments herein provide a print quality system that does not impose a special item such as a barcode be printed on the page. Further, the systems and methods described herein work with any unmodified customer print job (no extra barcodes), work with any supported print stream, and do not require hardware customer adjustment.

Figure 3:
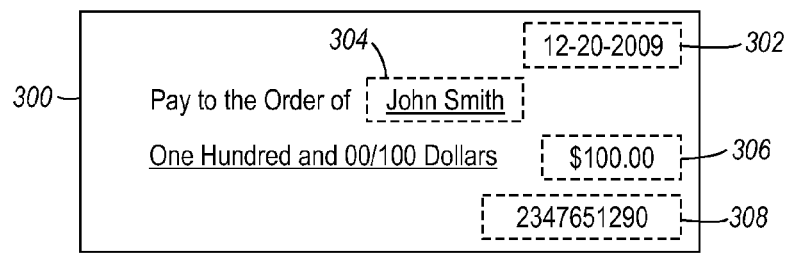
FIG. 3 is a schematic diagram of a bitmap image according to embodiments herein.

For example, as shown in FIG. 3, the bitmapped image 300 includes many dark pixels and many light pixels which make up the image that will be transferred to a sheet of media. With embodiments herein, images can be collected from many predetermined areas 302, 304, 306, 308 according to user preferences (based on user input that defines the areas (templates) from which the images will be obtained). The characters within these areas 302, 304, 306, 308 are recognized by an optical character recognition process. Then, information such as the name 304, amount 306, and bank number 308 are accumulated by the embodiments herein. This data is then checked against the data that was expected to be printed for the print job. For example, if a series of checks were printed, the amount area 306 could be subjected to a mathematical summing operation and the total value of the checks printed could be compared with the value that was expected, in order to validate that the printing operation occurred properly.

While FIG. 3 illustrates a check or negotiable instrument, those ordinarily skilled in the art would understand that the embodiments here are not limited to the type of document they can process. While the embodiments herein work well with all critical documents, such as checks, stocks, bonds, insurance policies, legal documents, etc., they also work equally well with publications, mailings, papers, handouts, photographs, and all other types of printed items.

Thus, with the embodiments herein, the actual decomposed print image becomes the data source instead of a scanned image and the data collection is therefore independent of any support print stream. Further, because the user selects the areas from which the images will be collected, the "template" is customer selectable. The desired template is tunable at the interface 208 console which adds flexibility to the customers print product. Also, since the data is collected in real time it can be used to perform validation of expected data and expected totals in the case of a summation request.

The embodiments herein can work with any unmodified customer print job and have minimal hardware requirements, and thus no hardware customer adjustment will be required. The data can be used to halt the print flow in case of error, or to issue an alert of mis-validation or unexpected sum.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
    capturing, from a printing device's memory buffer by a computerized device, bitmapped images of pages of a print job that have been raster image processed while being printed by said printing device;
    collecting electronic image data from at least one predetermined area of said bitmapped images of said pages using said computerized device, said collecting being performed on said print job by said computerized device while said printing device is printing said print job;
    processing said electronic image data by summing numerical values within said electronic image data from a series of said pages of said print job into numerical totals to produce accumulated data for said pages of said print job using said computerized device; and
    comparing said accumulated data to expected data to validate whether said print job printed correctly.

2. The method according to claim 1, further comprising producing an audit report based on said comparing process using said computerized device and outputting said audit report from said printing device.

3. The method according to claim 1, said processing comprising performing at least one mathematical operation on said electronic image data using said computerized device.

4. The method according to claim 1, said at least one predetermined area of said bitmapped images comprising less than all of each bitmapped image and comprising the same area on each of said bitmapped images.

5. A method comprising:
    capturing, from a printing device's memory buffer, by a computerized device within said printing device, bitmapped images of pages of a print job that have been raster image processed by a digital front end of said printing device while being printed by said printing device;
    collecting electronic image data from at least one predetermined area of said bitmapped images of said pages using said computerized device, said collecting being performed on said print job by said computerized device while said printing device is printing said print job;
    performing optical character processing on said electronic image data to identify characters and numbers within said bitmapped images;
    processing said characters and numbers by summing numerical values within said electronic image data from a series of said pages of said print job into numerical totals to produce accumulated data for said pages of said print job using said computerized device; and
    comparing said accumulated data to expected data to validate whether said print job printed correctly.

6. The method according to claim 5, further comprising producing an audit report based on said comparing process using said computerized device and outputting said audit report from said printing device.

7. The method according to claim 5, said processing comprising performing at least one mathematical operation on said numbers using said computerized device.

8. The method according to claim 5, said at least one predetermined area of said bitmapped images comprising less than all of each bitmapped image and comprising the same area on each of said bitmapped images.

9. A printing device comprising:
    a computerized device capturing, from a memory buffer of said printing device, bitmapped images of pages of a print job that have been raster image processed while being printed by said printing device,
    said computerized device collecting electronic image data from at least one predetermined area of said bitmapped images of said pages,
    said collecting being performed on said print job by said computerized device while said printing device is printing said print job,
    said computerized device processing said electronic image data by summing numerical values within said electronic image data from a series of said pages of said print job into numerical totals to produce accumulated data for said pages of said print job, and said computerized device comparing said accumulated data to expected data to validate whether said print job printed correctly.

10. The printing device according to claim 9, said computerized device producing an audit report based on said comparing process and said printing device outputting said audit report.

11. The printing device according to claim 9, said processing comprising performing at least one mathematical operation on said electronic image data using said computerized device.

12. The printing device according to claim 9, said at least one predetermined area of said bitmapped images comprising less than all of each bitmapped image and comprising the same area on each of said bitmapped images.

13. A non-transitory computer storage medium, readable by a computer, tangibly embodying instructions executable by said computer to perform a method comprising:

capturing, from a printing device's memory buffer, by a computerized device, bitmapped images of pages of a print job that have been raster image processed while being printed by said printing device;

collecting electronic image data from at least one predetermined area of said bitmapped images of said pages using said computerized device, said collecting being performed on said print job by said computerized device while said printing device is printing said print job;

processing said electronic image data by summing numerical values within said electronic image data from a series of said pages of said print job into numerical totals to produce accumulated data for said pages of said print job using said computerized device; and comparing said accumulated data to expected data to validate whether said print job printed correctly.

14. The non-transitory computer storage medium according to claim 13, said method further comprising producing an audit report based on said comparing process using said computerized device and outputting said audit report from said printing device.

15. The non-transitory computer storage medium according to claim 13, said processing comprising performing at least one mathematical operation on said electronic image data using said computerized device.

16. The non-transitory computer storage medium according to claim 13, said at least one predetermined area of said bitmapped images comprising less than all of each bitmapped image and comprising the same area on each of said bitmapped images.

* * * * *